United States Patent [19]
Yoshimatsu

[11] Patent Number: 5,412,307
[45] Date of Patent: May 2, 1995

[54] RESIDUAL CAPACITY INDICATING DEVICE

[75] Inventor: Morio Yoshimatsu, Kanagawa, Japan

[73] Assignee: Sony Corporation, Japan

[21] Appl. No.: 110,648

[22] Filed: Aug. 9, 1993

Related U.S. Application Data

[63] Continuation of Ser. No. 895,686, Jun. 9, 1992, abandoned.

[51] Int. Cl.$^6$ ................................................. H02J 7/00
[52] U.S. Cl. ............................................. 320/44; 320/48
[58] Field of Search ................................ 320/43, 44, 48;
324/426, 427, 431, 433; 340/636

[56] References Cited

U.S. PATENT DOCUMENTS

| | | | |
|---|---|---|---|
| 4,027,231 | 5/1977 | Lohrmann | 320/48 X |
| 4,052,717 | 10/1977 | Arnold et al. | 320/48 X |
| 4,080,560 | 3/1978 | Abert | 320/48 X |
| 4,426,612 | 1/1984 | Wicnienski et al. | 320/48 X |
| 5,105,180 | 4/1992 | Yamada et al. | 340/636 |
| 5,124,627 | 6/1992 | Okada | 320/44 |

FOREIGN PATENT DOCUMENTS

| | | | |
|---|---|---|---|
| 0010179 | 1/1979 | Japan | 324/433 |
| 0109882 | 8/1979 | Japan | 324/431 |
| 0056177 | 3/1984 | Japan | 324/426 |
| 1100479 | 4/1989 | Japan | |

Primary Examiner—Kristine L. Peckman
Attorney, Agent, or Firm—Ronald P. Kananen

[57] ABSTRACT

A residual capacity indicating device for indicating the residual capacity of a battery, the discharge voltage of which decreases when the same is discharged and the capacity of which increases with the increase of its temperature, comprises differential amplifiers for comparing the output voltage of the battery with reference voltages. LEDs are driven by the outputs of the differential amplifiers, respectively, according to the residual capacity of the battery to indicate the residual capacity of the battery. The reference voltages are determined by a combination of a Zener diode and a pair of resistors connected to each of the inverting terminals of the differential amplifiers. Since the Zener diode has a temperature characteristic opposite that of the resistors, the residual capacity of the battery can correctly be indicated regardless of the variation of the temperature of the battery.

5 Claims, 4 Drawing Sheets

RESIDUAL CAPACITY INDICATING DEVICE

This application is a continuation of application Ser. No. 07/895,686, filed Jun. 9, 1992, now abandoned.

BACKGROUND OF THE INVENTION

1. Field of the Invention

The present invention relates to a residual capacity indicating device suitable for indicating the residual capacity of a secondary battery, such as those consisting of lithium cells.

2. Description of the Prior Art

Recently, many secondary batteries are used as a power supply for compact, portable electronic apparatus including radios, tape recorders and portable VTRs. The applicant of the present patent application proposed previously a residual capacity indicating device which indicates the residual capacity of a secondary battery by a plurality of LEDs in Japanese Patent Laid-open (Kokai) No. Hei 1-100479. This residual capacity indicating device will be described briefly with reference to FIG. 3.

In FIG. 3, indicated at 1 is a secondary battery such as that consisting of lithium cells. The lithium cell has a positive electrode of $LiMn_2O_4$ or the like. The discharge voltage of the lithium cell drops with discharge time and the capacity of the same increases with temperature. The secondary battery 1 is connected to a portable electronic apparatus (which will be designated simply as "load"), not shown, and a residual capacity indicating circuit shown in FIG. 3 is connected to the secondary battery 1. The positive electrode of the secondary battery 1 is grounded through a variable resistor 2. The slider 2a of the variable resistor 2 is connected to the noninverting terminals of the differential amplifiers forming comparators 5a, 5b and 5c. The positive electrode of the secondary battery 1 is connected through resistors 3a, 3b and 3c to the inverting terminals of the comparators 5a, 5b and 5c. The respective inverting terminals of the comparators 5a, 5b and 5c are grounded through resistors 4a, 4b and 4c, respectively. The resistors 3a and 4a, the resistors 3b and 4b and the resistors 3c and 4c determine reference voltages to be applied to the inverting terminals, i.e., reference input terminals, of the comparators 5a, 5b and 5c, respectively. The resistances of the resistors 3a and 4a, the resistors 3b and 4b and the resistors 3c and 4c are determined according to detection points, respectively. The comparators 5a, 5b and 5c compare the voltage of the slider 2a of the variable resistor 2 connected to the secondary battery 1 with the reference voltages determined by the resistors 3a and 4a, the resistors 3b and 4b and the resistors 3c and 4c, respectively, and provides output signals if the voltage of the secondary battery 1 is higher than the reference voltages. The output terminals of the comparators 5a, 5b and 5c are connected to the bases of npn transistors 6a, 6b and 6c, respectively. The collectors of the transistors 6a, 6b and 6c are connected to the cathodes of LEDs 7a, 7b and 7c, respectively and the anodes of the LEDs 7a, 7b and 7c are connected to a supply terminal 8 to which a positive dc voltage is applied. The emitters of the transistors 6a, 6b and 6c are grounded. When the npn transistors 6a, 6b and 6c are in an ON state, the LEDs 7a, 7b and 7c connected to the collectors of the transistors 6a, 6b and 6c emit light. Suppose that the secondary battery 1 has discharge characteristics as shown in FIG. 4 showing the variation of discharge voltage with discharge time, and that the detection voltage $V_1$, $V_2$ and $V_3$ are to be detected at three detection points $A_1$, $A_2$ and $A_3$ corresponding to residual discharge times 0 min, 60 min and 120 min and compared with the reference voltages by the comparators 5a, 5b and 5c. Then, none of the LEDs 7a, 7b and 7c becomes radiant if the discharge voltage of the secondary battery 1 is lower than the voltage $V_1$ at the detection point $A_1$. If the discharge voltage of the secondary battery 1 is not lower than the voltage $V_3$ at the detection point $A_3$, all the LEDs 7a, 7b and 7c become radiant. If the discharge voltage of the secondary battery 1 is equal to the voltage $V_2$ at the detection point $A_2$, only the LEDs 7b and 7c become radiant. Thus, the residual discharge time of the secondary battery 1 can be estimated from the light emitting conditions of the LEDs.

The residual capacity indicating device described with reference to FIGS. 3 and 4 enables the estimation of the residual capacity of the secondary battery, which is very convenient in using the electronic apparatus powered by the secondary battery. However, the reference voltages applied to the reference voltage input terminals of the comparators 5a, 5b and 5c determined by the resistors 3a and 4a, the resistors 3b and 4b and the resistors 3c and 4c remain constant only while the secondary battery 1 is maintained at a constant temperature, for example, at a constant ordinary temperature. If the secondary battery 1 consists of lithium cells, the possible discharge time of the battery 1 varies with the ambient temperature. For example, the capacity of the secondary battery 1 increases with the increase of temperature and hence the residual discharge time increases. Furthermore, since the reference voltages rise with the increase of temperature, it is possible that only the LED 7c becomes radiant when the discharge voltage is $V_2$ at the detection point $A_2$ (FIG. 4) where both the LEDs 7b and 7c are expected to be radiant. Thus, the residual capacity indicating device is unable to indicate the actual residual capacity of the secondary battery 1 if the ambient temperature is variable.

SUMMARY OF THE INVENTION

Accordingly, the present invention has been made to solve the foregoing problems in the prior art and it is therefore an object of the present invention to provide a residual capacity indicating device capable of indicating the residual capacity of a battery regardless of temperature variation.

In one aspect of the present invention, a residual capacity indicating device for indicating the residual capacity of a battery (1) having a capacity that increases with the increase of temperature, comprises comparing means (5a, 5b, 5c) for comparing the output voltage of the battery (1) with reference voltages, and indicating means (7) for indicating the residual capacity of the battery (1), wherein the reference voltages are determined by resistors and a device (10) having a temperature characteristic opposite that of the resistors.

The reference voltages applied to the comparing means (5a, 5b, 5c) are changed according to the temperature of the battery (1). For example, if the temperature of the battery (1) increases, the reference voltages are reduced from those for an ordinary temperature so that the indicating means (7) become radiant at voltages lower than those at which the indicating means (7) become radiant when the battery (1) is at the ordinary temperature. Thus, the residual capacity of the battery (1) can accurately be indicated regardless of the temperature of the battery (1).

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 3:
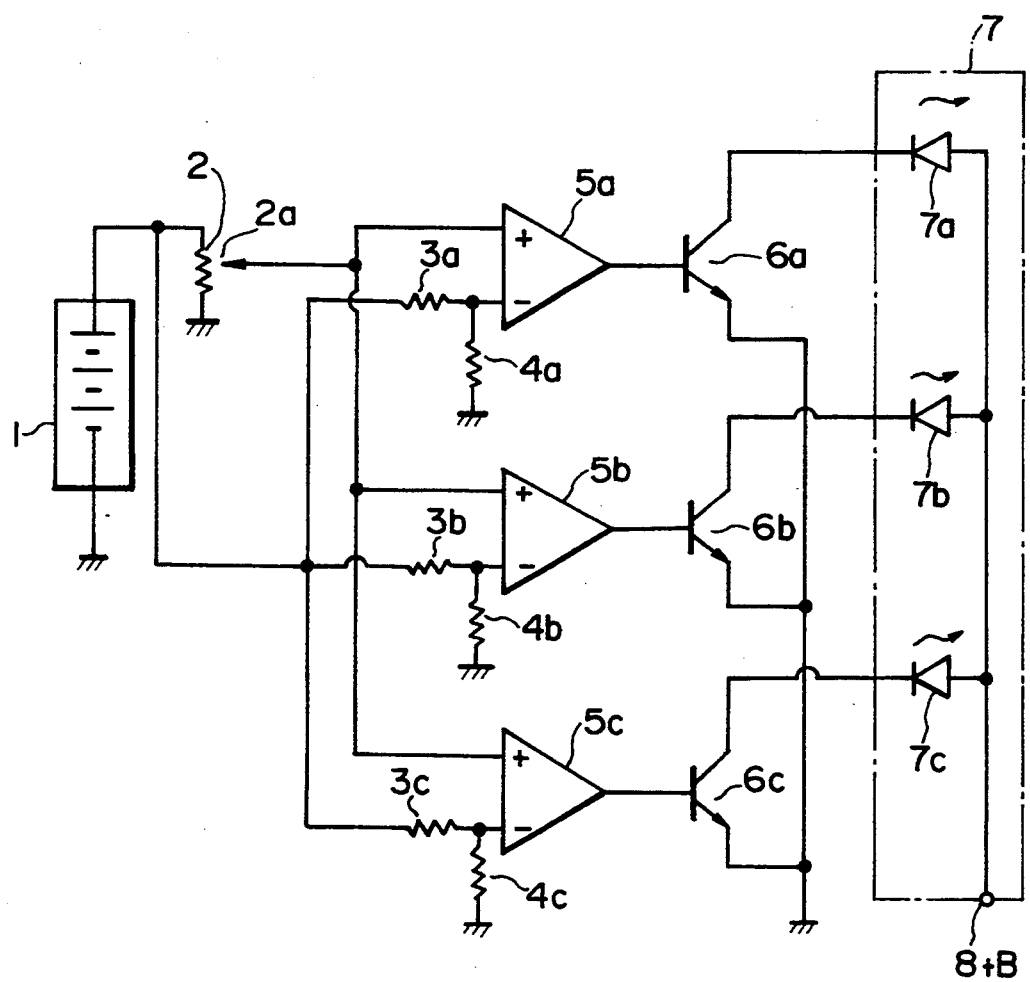
FIG. 3 is a circuit diagram of a prior art residual capacity indicating device.
Figure 4:
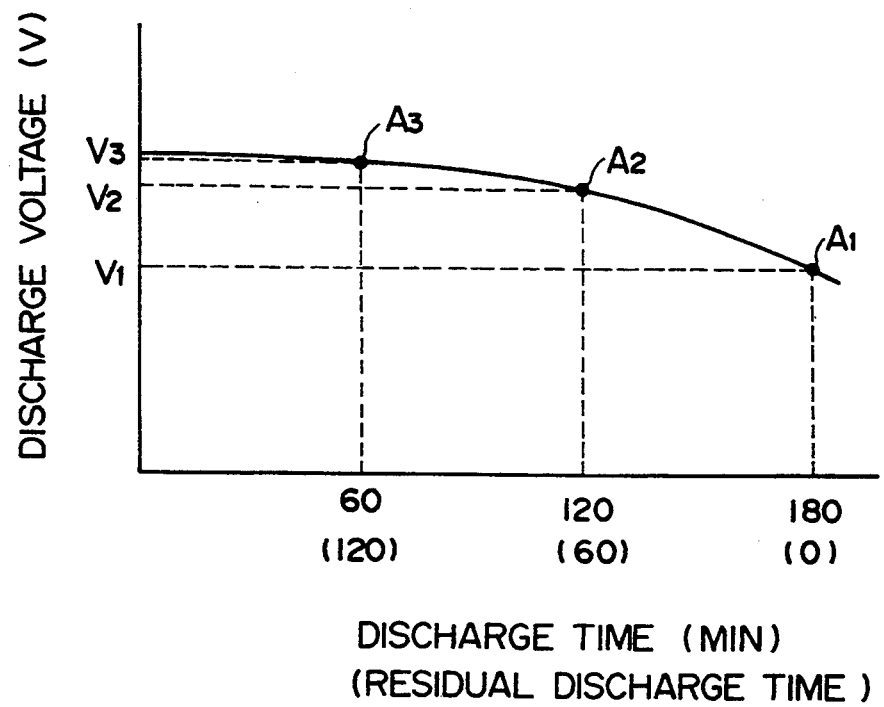
FIG. 4 is a graph of assistance in explaining the discharge characteristics of a battery.

A residual capacity indicating device in a preferred embodiment according to the present invention will be described hereinafter with reference to FIG. 1, in which parts like or corresponding to those shown in FIG. 3 are denoted by the same reference characters.

Figure 1:
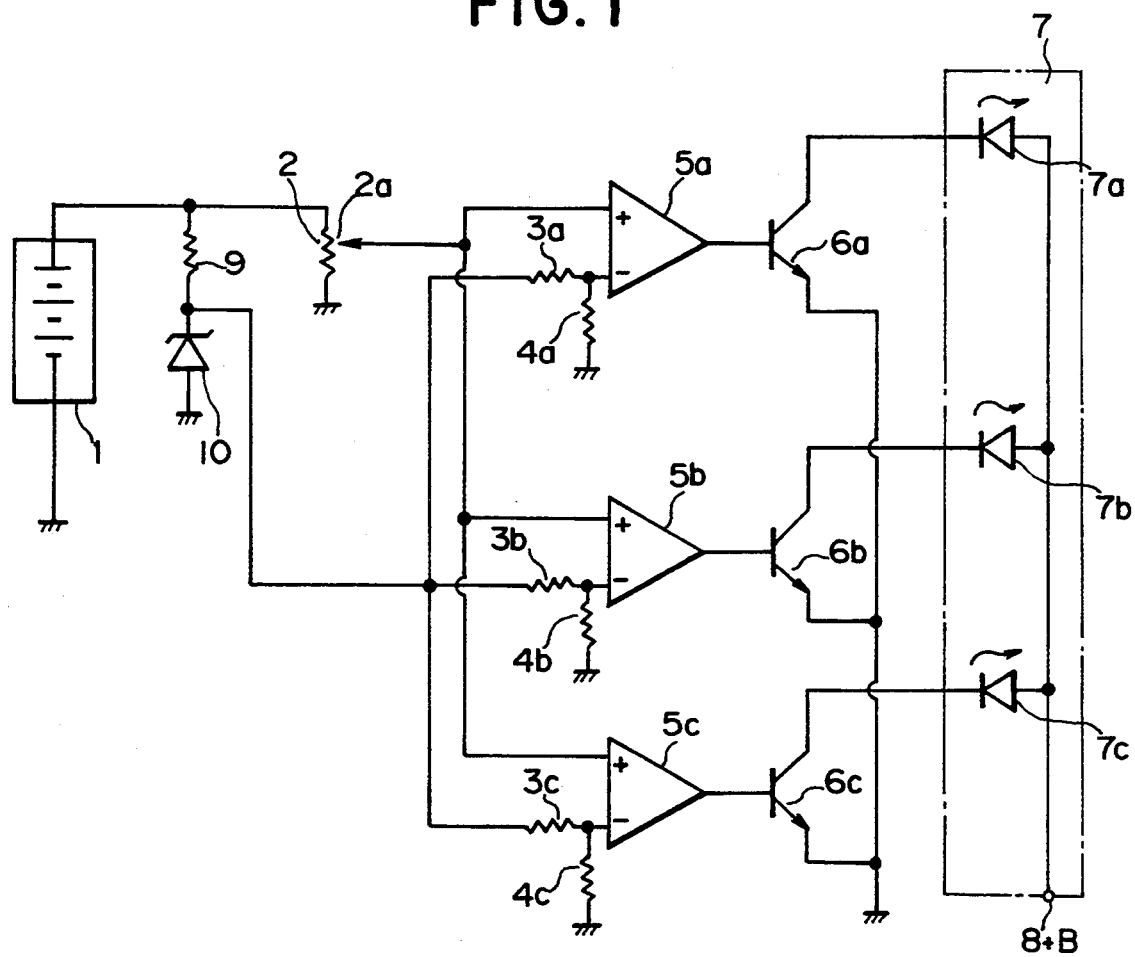
FIG. 1 is a circuit diagram of a residual capacity indicating device in a preferred embodiment according to the present invention.

Referring to FIG. 1, a battery 1 is a secondary battery having a rated voltage of, for example, 8.5 V consisting of, for example, lithium cells. The discharge voltage of the battery 1 decreases as the battery 1 is discharged, and the capacity of the battery 1 increases with an increase in temperature. The battery 1 is connected to a portable load, not shown, and to a residual capacity indicating device as shown in FIG. 1. The positive electrode of the battery i is grounded through a variable resistor 2 having a maximum resistance of, for example, 10 kΩ, and the slider 2a of the variable resistor 2 is connected to the respective noninverting terminals of differential amplifiers forming comparators 5a, 5b and 5c. One end of a resistor 9 of 180 Ω is connected to the positive electrode of the battery 1 and the other end of the same is connected to the negative electrode of a Zener diode 10. The positive electrode of the Zener diode 10 is grounded. The negative electrode of the Zener diode 10 is connected through resistors 3a, 3b and 3c respectively having resistances of, for example, 3.6 kΩ, 2.7 kΩ and 2 kΩ to the inverting terminals of the comparators 5a, 5b and 5c. The inverting terminals of the comparators 5a, 5b and 5c are grounded through resistors 4a, 4b and 4c having a resistance of, for example, 10 kΩ. The resistors 3a and 4a, the resistors 3b and 4b and the resistors 3c and 4c determine reference voltages to be applied to the inverting terminals, i.e., reference input terminals, of the comparators 5a, 5b and 5c, respectively. The voltage of the battery 1 that appears at the slider 2a of the variable resistor 2 is compared with the reference voltages determined by the resistors 3a and 4a, the resistors 3b and 4b and the resistors 3c and 4c by the comparators 5a, 5b and 5c. If the output voltage of the battery 1 is higher than the reference voltages, the comparators 5a, 5b and 5c provides output signals, respectively. The output terminals of the comparators 5a, 5b and 5c are connected to the bases of npn transistors 6a, 6b and 6c, respectively. The collectors of the transistors 6a, 6b and 6c are connected to the cathodes of LEDs 7a, 7b and 7c, respectively, while the anodes of the LEDs 7a, 7b and 7c are connected to a supply terminal 8 to which a positive dc voltage is applied. The emitters of the transistors 6a, 6b and 6c are grounded. When the npn transistors 6a, 6b and 6c are in an ON state, the LEDs 7a, 7b and 7c connected respectively to the collectors of the npn transistors 6a, 6b and 6c become radiant; that is, the LEDs 7a, 7b and 7c become radiant when the output voltages of the comparators 5a, 5b and 5c are 7.9 V, 7.4 V and 7.0 V, respectively.

The operation of the residual capacity indicating device thus constructed will be described hereinafter with reference to FIG. 2 on an assumption that the battery 1 has discharge characteristics as represented by a curve 11, in which the capacity of the battery 1 is zero at a detection point $A_0$, and the detection voltage is 7.0 V at a detection point $A_1$, 7.4 V at a detection point $A_2$ and 7.9 V at a detection point $A_3$. None of the LEDs 7a, 7b and 7c are radiant at a discharge voltage in a range between the detection points $A_0$ and $A_1$, only the LED 7c is radiant at a discharge voltage in a range between the detection points $A_1$ and $A_2$, only the LEDs 7b and 7c are radiant at a discharge voltage in a range between the detection points $A_2$ and $A_3$, and all the LEDs 7a, 7b and 7c are radiant at a discharge voltage higher than a discharge voltage at the detection point $A_3$ to indicate the residual discharge time of the battery 1.

Figure 2:
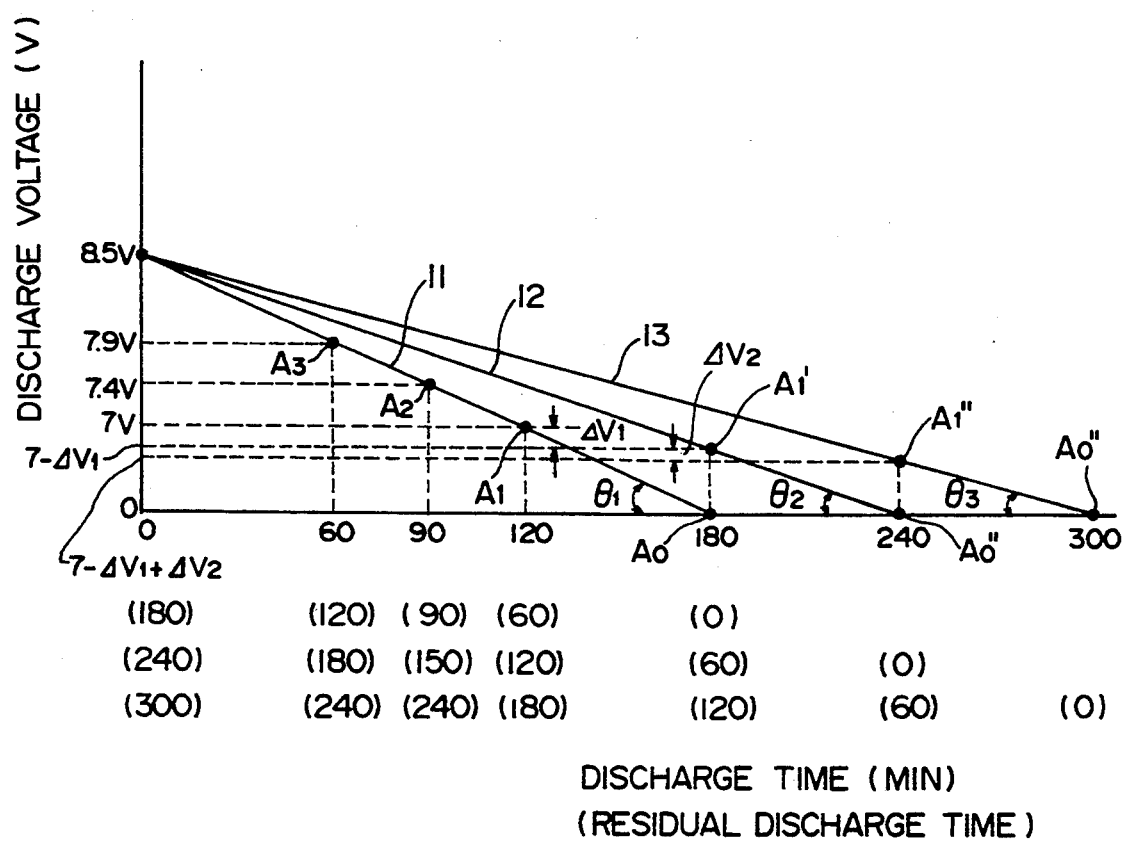
FIG. 2 is a graph of assistance in explaining the discharge characteristics of a battery.

In FIG. 2, curves 12 and 13 represent the discharge characteristics of the battery 1 when the temperature of the battery 1 is increased to, for example, 30° C. and 40° C., respectively.

Conditions represented by the curve 12 will be examined. Since $\theta_1 > \theta_2$, where $\theta_1$ is the inclination of the curve 11 to the horizontal axis and $\theta_2$ is the inclination of the curve 12 to the horizontal axis, a discharge voltage at the detection point $A_1'$ on the curve 12 corresponding to the detection point $A_0$ on the curve 11 where the residual discharge time is zero is 7 V$-\Delta V_1$, which is lower than the discharge voltage of 7 V at the detection point $A_1$ on the curve 11. Although the residual discharge time is 60 min in this state, all the LEDs 7a, 7b and 7c of the prior art residual capacity indicating device shown in FIG. 3 are turned off to indicate that the battery has exhausted. Such incorrect indication occurs similarly in a state represented by the curve 13; that is, since $\theta_2 > \theta_3$, where $\theta_3$ is the inclination of the curve 13 to the horizontal axis, a discharge voltage at a detection point $A_1''$ on the curve 13 corresponding to a detection point $A_0'$ on the curve 12 where the discharge voltage is zero is 7 V$-(\Delta V_1 + \Delta V_2)$, which is lower than the discharge voltage at the detection point $A_1'$. The residual capacity indicating device of the present invention changes the reference voltages applied to the comparators 5a, 5b and 5c, respectively, according to the change of the temperature of the battery 1 by the agency of the Zener diode 10. Most Zener diodes having a relatively low rated voltage are of a Zener breakdown type, have a negative temperature coefficient of current, and the current flowing through such a Zener diode increases with the increase of the temperature. The Zener diode 10 is such a Zener diode. Accordingly, the reference voltages applied respectively to the inverting terminals of the comparators 5a, 5b and 5c decreases when the temperature of the battery I increases. Accordingly, the LEDs 7a, 7b and 7c become radiant at a discharge voltage, i.e., 7 V$-\Delta V_1$ at the detection point $A_1'$ on the curve 12, lower than the discharge voltage at the discharge voltage at the detection point $A_1$ on the curve 11. Thus, the residual capacity of the battery 1 changing with the temperature of the battery 1 can accurately be indicated.

The Zener diode 10 may be substituted by any suitable device having a negative temperature characteristic.

Although the invention has been described in its preferred form with a certain degree of particularity, obviously many changes and variations are possible therein. It is therefore to be understood that the present invention may be practiced otherwise than as specifically described herein without departing from the spirit and scope thereof.

What is claimed is:

1. A residual capacity indicating device for indicating the residual capacity of a battery having a discharge voltage which decreases as said battery is discharged and having said capacity which increases with an increase in temperature, said residual capacity indicating device comprising:

reference voltage generating means for detecting said discharge voltage of said battery and for producing a battery reference voltage;

temperature compensating means for detecting said discharge voltage, for temperature compensating said discharge voltage, and for outputting a temperature compensated reference voltage;

voltage dividing means for receiving said temperature compensated reference voltage and for producing a plurality of comparison reference voltages, each of said plurality of comparison reference voltages being a different fraction of said temperature compensated reference voltage;

a plurality of comparators each having a non-inverting input for receiving said battery reference voltage from said reference voltage generating means and having an inverting input for receiving said comparison reference voltages from said voltage dividing means, each comparator producing a comparison output signal based upon a comparison of said battery reference voltage to said respective one of said comparison reference voltages and a plurality of indicating means each connected to a respective comparator, said indicating means indicating the residual capacity of said battery on the basis of said comparison output signals.

2. A residual capacity indicating device as set forth in claim 1, wherein an indication of said residual capacity of said battery is temperature compensated.

3. A residual capacity indicating device as set forth in claim 1, wherein said temperature compensating means comprises a resistor and a zener diode and wherein said zener diode has a temperature characteristic opposite that of said resistor.

4. A residual capacity indicating device as set forth in claim 1, wherein said plurality of indicating means comprise LEDs.

5. A residual capacity indicating device as set forth in claim 1, wherein:

said indicating means provides indications of at least three levels of capacity for said battery with said levels having different fractions of capacity; and said temperature compensating means maintains said fractions constant with varying temperatures.

* * * * *